(12) United States Patent
Montague

(10) Patent No.: US 8,044,976 B2
(45) Date of Patent: *Oct. 25, 2011

(54) EXTENDED ROTATION AND SHARPENING OF AN OBJECT VIEWED FROM A FINITE NUMBER OF ANGLES

(76) Inventor: Roland Wescott Montague, North Saanich (CA)

(*) Notice: Subject to any disclaimer, the term of this patent is extended or adjusted under 35 U.S.C. 154(b) by 0 days.

This patent is subject to a terminal disclaimer.

(21) Appl. No.: 12/826,067

(22) Filed: Jun. 29, 2010

(65) Prior Publication Data

US 2010/0302267 A1 Dec. 2, 2010

Related U.S. Application Data

(63) Continuation of application No. 11/279,222, filed on Apr. 10, 2006, now Pat. No. 7,773,100.

(51) Int. Cl.
*G09G 5/00* (2006.01)
(52) U.S. Cl. .................................. 345/649; 345/619
(58) Field of Classification Search .................. 345/619, 345/649, 650, 653, 655
See application file for complete search history.

(56) References Cited

U.S. PATENT DOCUMENTS

| 6,417,836 B1 | 7/2002 | Kumar et al. |
| 2002/0050988 A1* | 5/2002 | Petrov et al. .................. 345/418 |
| 2005/0195216 A1 | 9/2005 | Kramer et al. |
| 2006/0077211 A1 | 4/2006 | Zhou |

FOREIGN PATENT DOCUMENTS

| EP | 0559374 A1 | 8/1993 |
| EP | 0955610 A1 | 11/1999 |
| GB | 2387519 A | 10/2003 |

OTHER PUBLICATIONS

Mark Livingston et al., "Six Degree of Freedom Control with a Two-Dimensional Input Device: Intuitive Controls and Simple Implementations", Hewlett Packard, 1999, pp. 1-6.

* cited by examiner

*Primary Examiner* — Kee M Tung
*Assistant Examiner* — Jacinta M Crawford

(57) ABSTRACT

A method of continuously rotating a subject object top over bottom over top on a display screen encompasses jumping to a view having a longitude that is 180 degrees from the previous and displaying the image in an up-side-down orientation. Upon pausing, or completing the rotation by releasing the mouse button, a higher resolution image loads and displays thereby improving the sharpness or allowing the user to zoom in on additional detail.

19 Claims, 4 Drawing Sheets

EXTENDED ROTATION AND SHARPENING OF AN OBJECT VIEWED FROM A FINITE NUMBER OF ANGLES

BACKGROUND OF THE INVENTION

The present invention relates to software applications that display images of physical objects from a finite number of angles, and more particularly to a method for increasing the amount of rotation as well as sharpening the image displayed.

Internet multi-media viewers, such as Quicktime from Apple Computer, provide the experience of rotating a physical object by allowing a user to control which view, of a finite number of views taken from different angles, is to be displayed. Typically, the user will select the rotation mode then press and drag within the application.

Dragging horizontally displays a sequence of views of the object from angles where the value of the longitude coordinate varies. If there is enough data for 360 degree rotation then upon reaching one limit, the sequence continues from the opposite limit giving the appearance of continuous rotation around and around the object.

Dragging vertically displays a sequence of views of the object from angles where the value of the colatitude coordinate varies and stops rotation at an upper limit and a lower limit such that the object always appears right-side-up.

Dragging in a diagonal direction varies the values of both longitude and colatitude coordinates, as one would expect.

There remains a need to improve the user experience by providing both 360 degree rotation where the value of the longitude coordinate varies, and extended rotation where the value of the colatitude coordinate varies such that the object is able to be displayed up-side-down, right-side-up, as well as around and around at the same time.

There remains a second need to improve the user experience by sharpening the image of the object after the rotation is complete or the user performing an additional action.

BRIEF SUMMARY OF THE INVENTION

Accordingly, a first aspect of the present invention provides a method of rotating over the top or bottom of a subject object by defining the next view in sequence as a toggled up-side-down rendering of the view from a longitude angle that is 180 degrees different from the current. The method results in extending the possible rotation to include up-side-down, as well as continuous rotation top over bottom over top such that the object appears right-side-up then up-side-down then right-side-up.

A second aspect of the present invention provides a step of sharpening the view displayed by loading in a higher resolution image at the time the rotation is completed, paused, other user actions such as a button press, or as a step of a zoom function.

Other novel features of the present invention are apparent from the summary, detailed description, claims, and attached drawings.

BRIEF DESCRIPTION OF THE DRAWINGS

In drawings which help illustrate the present invention.

In all figures, like reference numerals represent the same or identical components of the present invention.

DETAILED DESCRIPTION OF THE PREFERRED EMBODIMENTS

Figure 1:
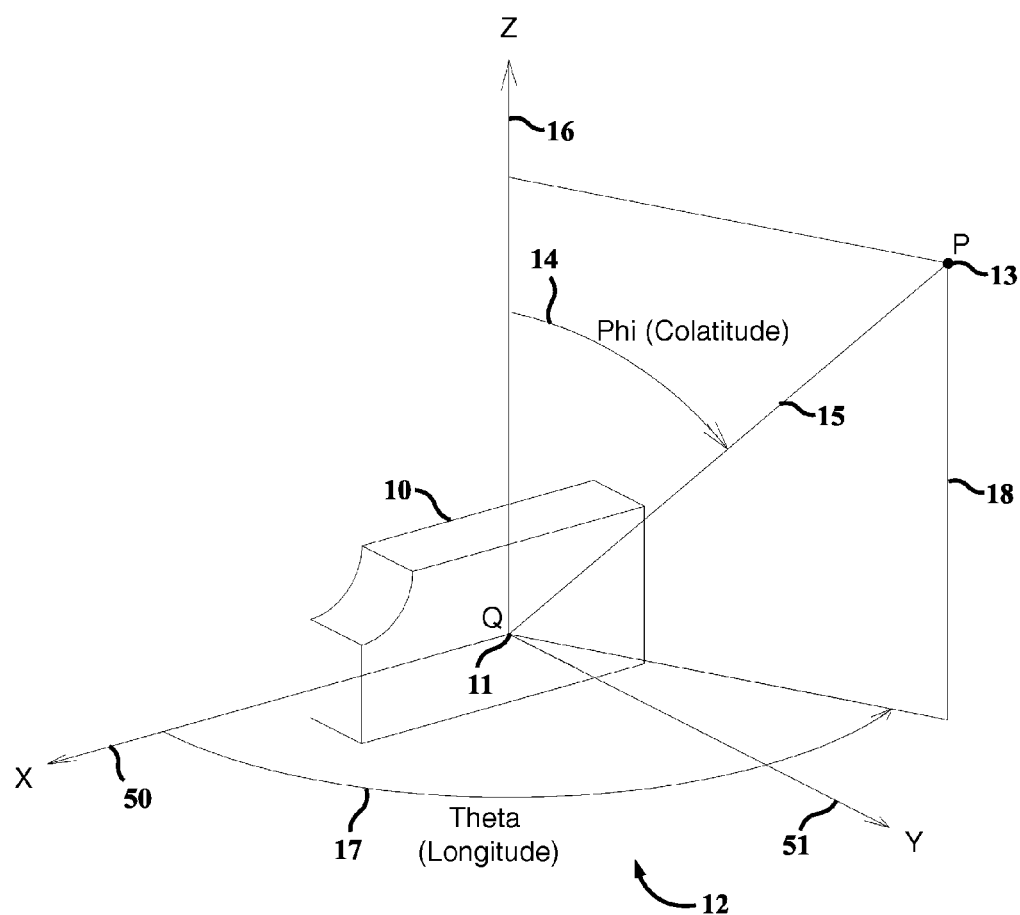
FIG. 1 is an isometric of an object in a spherical coordinate system.

FIG. 1 shows a 3-dimensional subject object 10 at a origin Q 11 of a spherical coordinate system 12 and a point P 13 from which object 10 is viewed. In the system of spherical Coordinates 12 point P 13 in 3-space is represented by an ordered triple (R, Phi, Theta) where R is the distance from P 13 to origin Q 11. An angle Phi 14 is the angle a radial line QP 15 makes with the positive direction of a z-axis 16, and an angle Theta 17 is the angle between a plane 18, containing P 13 and z-axis 16, and an xz-plane containing z-axis 16 and an x-axis 50. For further understanding, the Phi-surfaces (Phi=constant) are circular cones with z-axis 16 as axis; and the Theta-surfaces (Theta=constant) are vertical planes containing z-axis 16. Phi 14 is frequently referred to as the current value of the colatitude coordinate, and Theta 17 is the current value of the longitude coordinate.

Figure 2:
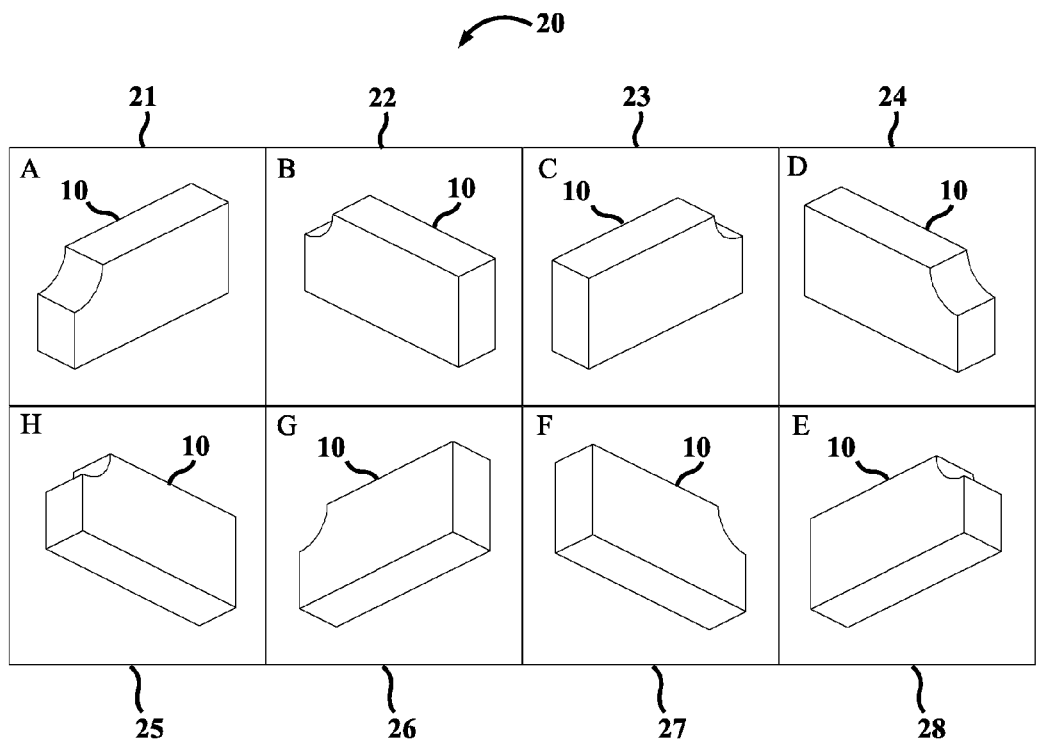
FIG. 2 is a graphical representation of a finite number views of an object stored in a data file.

FIG. 2 shows a simplified example of a graphical representation of data in a rectangular table 20 form storing 4×2 two dimensional views as seen from point P 13 to subject object 10. The top row, A to D, holds Phi 14 constant at 45 degrees and Theta 17 varies such that in view A 21 Theta=45, in view B 22 Theta=135, in view C 23 Theta=225, and in view D 24 Theta=315 degrees. Similarly, the bottom row, E to H, holds Phi 14 constant at 135 degrees and Theta 17 varies such that in view H 25 Theta=45, in view G 26 Theta=135, in view F 27 Theta=225, and in view E 28 Theta=315 degrees. The preferred number of views for an actual implementation of the present invention is 16×8 and will likely increase as technology becomes faster.

When a rotate mode is active, a user may manipulate a keyboard or a pointer device such that a desired sequence of the views displays on a screen. Typically, the current view is contiguous (including diagonal) with the previous view. Prior art has shown continuous rotation around z-axis 16 (by varying Theta 17) may be achieved by jumping from one end of a row to the other end of the same row. Such an action results in the following sequence of views, A 21, B 22, C 23, D 24, A 21, B 22, C 23, D 24, A 21, B 22 . . . . Similarly, rotating in the opposite direction is achieved by D 24, C 23, B 22, A 21, D 24, C 23, B 22, A 21, D 24, C 23 . . . and so forth for different rows. In the prior art, varying Phi 14 results in sequences in a column of the table, such as A 21 to H 25 or G 26 to B 22. However, the user reaches a limit of rotation at a downward looking view with Phi 14 at a minimum and reaches a limit at an upward looking view with Phi 14 at a maximum (but less than 180 degrees). There remains a need to tumble subject object 10 top over bottom over top to provide the appearance of limitless rotation similar to a user's hand holding and turning the physical subject object 10 for further inspection from any angle.

Figure 3:
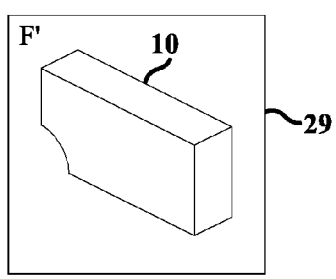
FIG. 3 shows view F' as an up-side-down version of view F.
Figure 4:
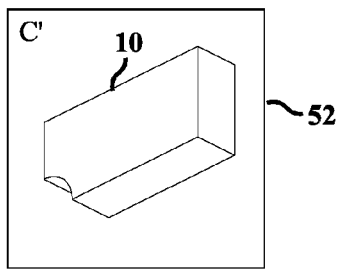
FIG. 4 shows view C' as an up-side-down version of view C.

According to the first aspect of the present invention, referring to FIGS. 2, 3 and 4, tumbling subject object 10 bottom over top over bottom over top, is achieved by a function controlling the sequence of views such as, A 21, H 25, F' 29, C' 52, A 21, H 25, F' 29 . . . , where view F' 29 is view F 27 rotated in plane by 180 degrees such that the image in the original view F 27 is up-side-down. Similarly, view C' 52 is an up-side-down version of view C 23. Some other sequences are B, G, E', D', B . . . ; C, F, H', A', C . . . ; H, A, C', F', H . . . ; F', H, A, C', F' . . . ; and so on. In a general system, a method comprises the steps of detecting the reaching of one end of a first column in table 20, determining the next view in sequence requires a jump to the same end of a second column that represents a Theta 17 value approximately 180 degrees different from the first column, where continued rotation in the same direction results in a sequence in the second column that is opposite in direction compared to the first column and every time a jump is required the view is toggled between rendering the images up-side-down and right-side-up.

An alternate explanation of the first aspect of the present invention is a function, having inputs Phi 14 and Theta 17, which determines the view to display. The function has the characteristic that if phi 14 is greater than 180 degrees then the image displayed is an up-side-down rendering of the view from a colatitude value of 360 degrees minus Phi 14 and a longitude value of 180 degrees from Theta 17. Whereby tumbling object 10 bottom over top over bottom over top results from the user sweeping Phi 14 through 0 to 360 then 0 to 360 degrees.

A second aspect of the present invention is the additional step of loading in and displaying a higher resolution image of the current view when the user completes the rotation by releasing a mouse button at the end of a drag. The user may now activate a zoom function for closer inspection with sharper detail than otherwise available.

Figure 5:
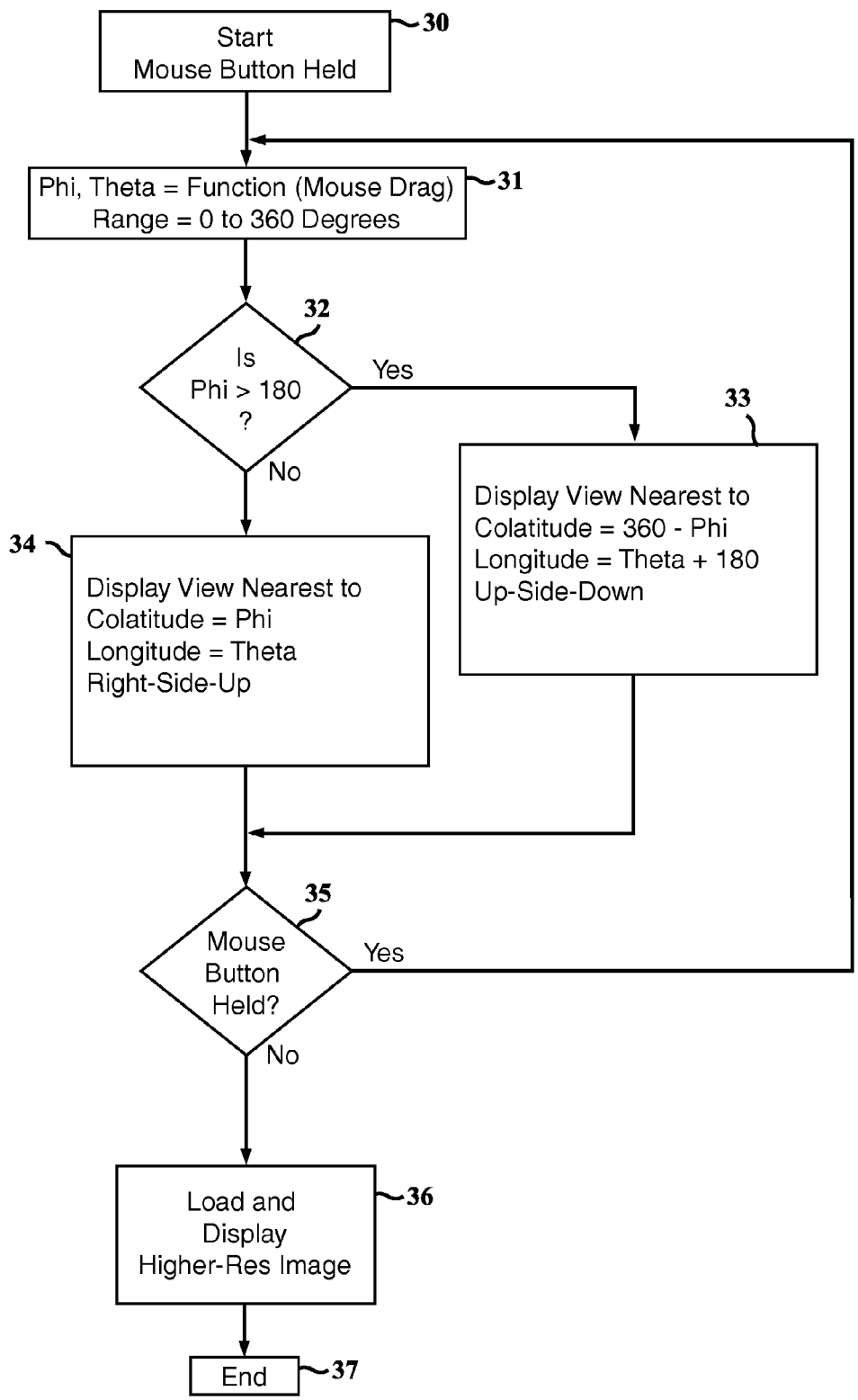
FIG. 5 is a flow chart of the present invention.

The flowchart shown in FIG. 5 describes the operation of the present invention. The rotation is started 30 upon the user activating the rotate mode by clicking an icon or selecting from a pull-down or pop-up menu, then pressing and holding the mouse button to begin a drag. In step 31, Phi 14 and Theta 17 values update in proportion to mouse movements. The valid ranges are from 0 to 360 degrees where increasing above 360 degrees results in restarting at 0 degrees, and decreasing below 0 degrees results in restarting at 360 degrees. The restarting behavior is also present in step 33. In step 32, if Phi 14 is greater than 180 degrees then the flow branches to step 33, otherwise branches to step 34. In step 33, an up-side-down rendering of the view nearest to having colatitude=(360−Phi) and longitude=(Theta+/−180) is displayed then continues to step 35. In step 34, a right-side-up rendering of the view nearest to having colatitude=Phi 14 and longitude=Theta 17 is displayed then continues to step 35. In step 35, if the user continues to hold the mouse button then the flow branches back to step 31 for further rotation, otherwise the flow branches to step 36. In step 36, a higher resolution version of the current view loads and displays then continues to the ending step 37.

Alternatively, subject object 10 may be viewed from varying amounts such as only from above the plane on which it rests. In such a case, the valid range of Phi 14 is approximately 90 to 0 and 360 to 270, where incrementally increasing greater than 90 degrees or decreasing less than 270 degrees is not permitted. Rotating object 10 top over bottom (such that the object is up-side-down) is still valid and follows the teachings in step 33.

A third aspect of the present invention provides a step of sharpening the view displayed by loading in a higher resolution image at the time either a rotation is paused, other user actions such as a button click, icon click, or as a step of a zoom function. The zoom function may behave such that zooming in closer than a predetermined limit causes the higher resolution image to load and display. Alternatively, if a computer system's resources allow, after the initial table 20 of views is loaded, all possible higher resolution images, or a portion thereof, may be loaded in a background thread and be displayed (if available) during normal rotation.

Figure 6:
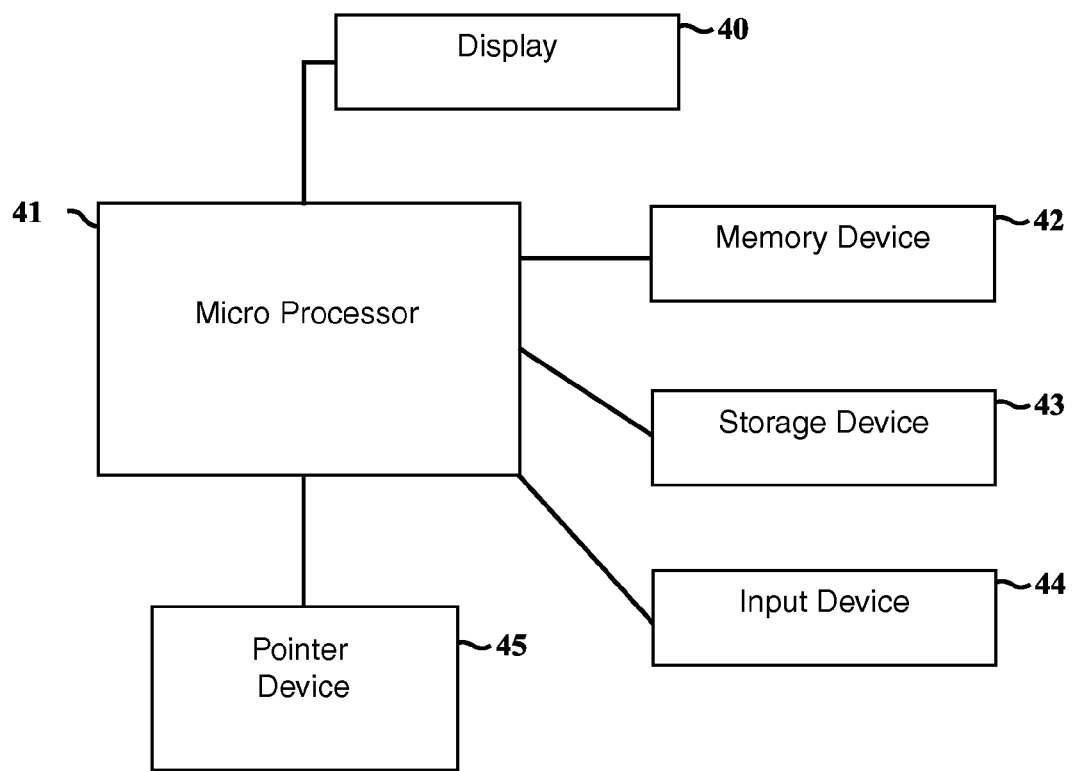
FIG. 6 is a diagram of a typical computer system.

Referring now to FIG. 6, a software application utilizing the present invention would typically run on an electronic device such as a computer, phone, or game console. The electronic device typically comprises a display screen 40, one or more microprocessors 41, a memory device 42, a storage device 43, an input device 44, and a pointer device 45. Microprocessor 41 communicates with memory device 42, storage device 43, input device 44, pointer device 45, and updates graphics displayed on display screen 40. Storage device 43 may be a hard-drive, internet connection, flash ram, etc. input device 44 may be a keyboard, remote button, touch screen area with character recognition, etc. Pointer device 45 may be a mouse, touch screen, touch pad, tablet, track ball, eye tracker, accelerometer, joystick, etc. Releasing a mouse button to complete a drag is equivalent to removing a stylus from a touch screen, and similar actions involving general pointer devices 45.

The present invention's teachings may be implemented in any general purpose application such as, but not limited to, internet browsers, publication packages, presentation packages, medical image packages, as well as non-interactive animations or movies where a user has little or no control. The animations may be of a predetermined or a random direction change pattern of rotation where a time delay controls the speed between frames.

Storage of the views may be arranged in many patterns such as: in a rectangular table 20 form; a linear form of views from A through to H (21, 22, 23, 24, 28, 27, 26, 25) whereby video compression and streaming techniques may be better utilized; a random ordering with a lookup table where security is improved; a plural of smaller rectangular tables to reduce the wait time for the first image to display; or a combination of these or other forms.

One may acquire the images of the views of object 10 through various digitizing means including, but not limited to, use of a digital camera, or renderings of a 3D computer model of the subject object.

It will be apparent to one skilled in the art that spherical coordinate system 12 may be orientated in any arbitrary direction, such that a colatitude coordinate is the angle radial line QP 15 makes with the positive direction of an x-axis 50, and a longitude coordinate is the angle between a plane containing P 13 and x-axis 50, and a xy-plane containing x-axis 50 and a y-axis 51.

Thus, the present invention provides a method of extending the amount of rotation of an object. When rotating over the top, a view of the backside is displayed up-side-down and continued rotation over the original bottom results in the object appearing right-side-up. The user experience therefore improves such that continuous rotation of top over bottom over top is possible. In addition, pausing or completing the rotation results in the display of a higher resolution image to improve sharpness or enhance the ability to zoom in closer and show additional detail.

Specific preferred embodiments of the present invention are described hereinabove; it is to be understood that the invention is not limited to those particular embodiments, and one skilled in the art may make various changes and modifications without departing the form the scope or the spirit of the invention as it is defined in the attached claims.

What is claimed is:

1. A method for rotating an object displayed on an electronic device and sharpening, comprising:

a. providing a first means for displaying a predetermined view of an object, where said object is rotated by sequencing through a plurality of predetermined views observed from predetermined angles; and b. providing a second means for specifying a current angle from which to observe said object; and c. displaying one of said plurality of predetermined views nearest to having said current angle; and d. responsive to an input device action, loading a higher resolution image of said predetermined view and displaying said higher resolution image of said predetermined view;

wherein said input device action results in completing the object rotation.

2. The method as recited in claim 1 wherein said first means comprises a software application tangibly embodied in a non-transitory storage device.

3. The method as recited in claim 2 wherein said higher resolution image is loaded from the internet.

4. The method as recited in claim 3 wherein said plurality of predetermined views are images of a physical object.

5. The method as recited in claim 4 wherein said images were acquired through use of a digital camera from said predetermined angles.

6. The method as recited in claim 1 wherein said images of said plurality of predetermined views observed from predetermined angles were acquired by previously rendering a 3D computer model of said object into raster image files.

7. A method for rotating an object displayed on an electronic device and sharpening, comprising:

a. providing a first means for displaying a predetermined view of an object, where said object is rotated by sequencing through a plurality of predetermined views observed from predetermined angles; and b. providing a second means for specifying a current angle from which to observe said object; and c. displaying one of said plurality of predetermined views nearest to having said current angle; and d. responsive to an input device action, loading a higher resolution image of said predetermined view and displaying said higher resolution image of said predetermined view;

wherein said input device action results in zooming in.

8. The method as recited in claim 7 wherein said first means comprises a software application tangibly embodied in a non-transitory storage device.

9. The method as recited in claim 8 wherein said input device action results in zooming in closer than a predetermined limit.

10. The method as recited in claim 9 wherein said higher resolution image is loaded from the internet.

11. The method as recited in claim 10 wherein said plurality of predetermined views are images of a physical object.

12. The method as recited in claim 11 wherein said images were acquired through use of a digital camera from said predetermined angles.

13. The method as recited in claim 7 wherein said images of said plurality of predetermined views observed from predetermined angles were acquired by previously rendering a 3D computer model of said object into raster image files.

14. A method for rotating an object displayed on an electronic device and sharpening, comprising:

a. providing a first means for displaying a predetermined view of an object, where said object is rotated by sequencing through a plurality of predetermined views observed from predetermined angles; and b. providing a second means for specifying a current angle from which to observe said object; and c. displaying one of said plurality of predetermined views nearest to having said current angle; and d. responsive to an input device action, loading a higher resolution image of said predetermined view and displaying said higher resolution image of said predetermined view;

wherein said input device action results in pausing the object rotation.

15. The method as recited in claim 14 wherein said first means comprises a software application tangibly embodied in a non-transitory storage device.

16. The method as recited in claim 15 wherein said higher resolution image is loaded from the interne.

17. The method as recited in claim 16 wherein said plurality of predetermined views are images of a physical object.

18. The method as recited in claim 17 wherein said images were acquired through use of a digital camera from said predetermined angles.

19. The method as recited in claim 14 wherein said images of said plurality of predetermined views observed from predetermined angles were acquired by previously rendering a 3D computer model of said object into raster image files.

* * * * *